United States Patent
Reiderman

(10) Patent No.: US 7,489,134 B2
(45) Date of Patent: Feb. 10, 2009

(54) MAGNETIC SENSING ASSEMBLY FOR MEASURING TIME VARYING MAGNETIC FIELDS OF GEOLOGICAL FORMATIONS

(76) Inventor: Arcady Reiderman, 1918 Baker Trail, Houston, TX (US) 77094

( * ) Notice: Subject to any disclaimer, the term of this patent is extended or adjusted under 35 U.S.C. 154(b) by 341 days.

(21) Appl. No.: 11/077,307

(22) Filed: Mar. 10, 2005

(65) Prior Publication Data

US 2006/0202699 A1    Sep. 14, 2006

(51) Int. Cl.
G01V 3/08    (2006.01)
(52) U.S. Cl. .................................................... 324/339
(58) Field of Classification Search ......... 324/323–377, 324/117 R, 117 H, 244–260
See application file for complete search history.

(56) References Cited

U.S. PATENT DOCUMENTS

| | | | | |
|---|---|---|---|---|
| 3,209,246 A | * | 9/1965 | Adams | 324/227 |
| 3,525,041 A | * | 8/1970 | Velsink | 324/117 R |
| 3,573,616 A | * | 4/1971 | Kahen | 324/117 H |
| 4,059,798 A | * | 11/1977 | Dierker et al. | 324/127 |
| 4,788,544 A | * | 11/1988 | Howard | 340/853.7 |
| 4,884,071 A | * | 11/1989 | Howard | 340/854.8 |
| 4,901,023 A | * | 2/1990 | Vail, III | 324/339 |
| 4,933,640 A | * | 6/1990 | Kuckes | 324/339 |
| 5,130,655 A | * | 7/1992 | Conti | 324/258 |
| 5,235,275 A | * | 8/1993 | Ando et al. | 324/238 |
| 5,583,429 A | * | 12/1996 | Otaka | 324/127 |
| 5,923,170 A | * | 7/1999 | Kuckes | 324/326 |
| 5,955,884 A | * | 9/1999 | Payton et al. | 324/339 |
| 6,100,696 A | * | 8/2000 | Sinclair | 324/339 |

OTHER PUBLICATIONS

Schwindt et al., Chip-scale atomic magnetometer, Dec. 27, 2004, Applied Physics Letters, vol. 85, No. 26, p. 6409-6411.*
Norman F. Ness, Magnetometers for Space Research, Space Scince Review 11 (1970) pp. 476-481.*

* cited by examiner

Primary Examiner—Jay M Patidar

(57) ABSTRACT

A magnetic sensing assembly for measuring magnetic field produced by a time varying electric current generated in geological formations is disclosed. The assembly comprises a soft magnetic core, a sensing coil wound on the core, and at least one miniature low noise magnetic field sensor disposed near an edge of the magnetic core. Due to strong magnetic flux concentration effect of the magnetic core the sensor facilitates very low noise magnetic measurements at a low rate of change of the magnetic field, while the sensing coil offers high sensitivity and low noise measurement at higher rates. The magnetic sensing assembly preferably comprises an earth field cancellation element. The assembly also includes an acquisition means synchronized with an electromagnetic transmitter to receive and process signals from sensing coil and from magnetic field sensor.

11 Claims, 4 Drawing Sheets

MAGNETIC SENSING ASSEMBLY FOR MEASURING TIME VARYING MAGNETIC FIELDS OF GEOLOGICAL FORMATIONS

CROSS-REFERENCE TO RELATED APPLICATIONS

Not applicable.

STATEMENT REGARDING FEDERALLY SPONSORED RESEACH OR DEVELOPMENT

Not applicable.

BACKGROUND OF THE INVENTION

1. Field of the Invention

The invention relates generally to the field of electromagnetic methods in geological formation exploration and evaluation. More particularly, the invention relates to a high sensitive magnetic sensing assembly for measuring magnetic field produced by a current flowing in the earth formations energized by an electromagnetic energy source. The invention also relates to the application of transient electromagnetic method, magnetometric resistivity, deep induction well logging and induction cross-hole imaging.

2. Background Art

In electromagnetic geophysical exploration and formation evaluation, electromagnetic signals are received and processed to provide information on conductivity distribution of the earth formations. The receiving sensors used for these purposes are typically either induction coils or magnetometers. Induction coils produce signal proportional to time rate of change of magnetic field. Magnetometers measure magnetic field flux density starting from static magnetic field. Typically the magnetic fields to be measured are produced by time-varying electric currents with a broad frequency spectrum.

An example of applications demanding a broadband magnetic receiver is transient electromagnetic measurements described in U.S. Pat. No. 5,955,884 issued to Payton et al. A remarkable advantage of transient electromagnetic instrument is an ability to separate in time the response of different spatial areas. In order to facilitate measurement of the formation response from nearby to deep areas both the electromagnetic transmitter and magnetic receiver should have substantially broad operating frequency band. In addition, the magnetic receiver should have high sensitivity to low frequency magnetic field corresponding to signals coming from deep areas. Yet another application that requires high sensitivity and a broad frequency band is cross-well induction imaging based on transient measurements.

Neither of the existing magnetic sensors can cover all the range of possible rates of the magnetic field changes, so a different sensors for different spectral ranges are to be used. State of the art of induction coils for geophysical applications in different frequency ranges is represented by products of Shlumberger, EMI Technology Center. The coils comprise a soft magnetic core, winding and a built-in low noise preamplifier. A relatively high frequency coil model BF-10 covers frequency range of 0.1 Hz-10 kHz.

An induction coil for low frequency range 0.0001-1000 Hz is the BF-4 model having minimum noise spectral density 0.1 $pT/\sqrt{Hz}$ at 1 Hz. The noise at lower frequency goes up fast and reaches 200 $pT/\sqrt{Hz}$ at 0.001 Hz. A low frequency coil normally requires a big ferromagnetic core and dozens of thousands of turns of winding limiting the upper operating frequency. The limit is caused by the self-resonance of the winding due its stray capacitance. It also requires very low noise amplifier at low frequency where low noise is hardly to achieve due to 1/f-type noise of an operational amplifier. Another example of a very low frequency coil can be found in U.S. Pat. No. 4,901,023 issued to Vail, III, in application to induction logging of cased wells. The coil uses a bulky magnetic core and 30,000 turns coil. Its high frequency is limited to only about 20 Hz.

Better performance for extremely low frequency may be expected from magnetometers. One of the best types of magnetometers that can be practically used for the electromagnetic measurement in geophysical application is a fluxgate magnetometer. The principle of operation of fluxgate magnetometers can be found for example in N. F. Ness, Magnetometers for space research, Space Science Review 11 (1970) 459-554. An example of a very low noise fluxgate magnetometer is TFM-100 model of Billingsley Magnetics. The noise spectral density at 1 Hz is 7 $pT/\sqrt{Hz}$. At around 1 Hz frequency the fluxgate magnetometers normally can not offer as low noise as the low frequency induction coils. On the other hand it has substantially slower noise increase at very low frequency. The frequency range where fluxgate magnetometers may compete with low frequency induction coils is 0.0001-0.1 Hz. Another advantage of the fluxgate magnetometer is much smaller dimensions and weight.

In a variety of applications there is still a need for a high sensitive magnetic receiver capable of sensing a broadband magnetic field signals. The magnetic sensing assembly should be preferably small and light. To provide a solution for this problem is an objective of the present invention.

BRIEF SUMMARY OF THE INVENTION

One aspect of the present invention is an instrument for determining an electromagnetic property of geological formations, comprising a transmitter to generate a time-varying electric current in the formations and a magnetic sensing assembly. The sensing assembly comprises a magnetic core having a high magnetic permeability, a sensing coil wound on the magnetic core to produce voltage signal proportional to a time rate of change of a magnetic field generated by the time-varying electric current in the geological formations and a magnetic sensor disposed near an edge of the magnetic core and magnetically coupled with the magnetic core to produce voltage signal proportional to magnetic flux density in the magnetic core. The magnetic sensor is preferably either a chip-scale atom-optical magnetometer (CSAM) or a miniature fluxgate sensor. The dimensions of the magnetic core are preferably chosen in relation with a magnetic sensing assembly noise requirement. The assembly further comprises an acquisition means for receiving and processing the voltage signals from the magnetic sensor and the sensing coil in order to provide low noise output with flat transfer function over a wide frequency range. The acquisition means preferably include means for measuring the voltage signals in a selected digitizing time window, said time window is synchronized to a cycle of the time-varying electric current in the formations, corresponding samples obtained in each cycle of the time-varying electric current are cumulatively summed over a number of such cycles in order to average out signals incoherent with the magnetic field generated by the time-varying electric current in the geological formations.

The magnetic sensing assembly preferably comprises an adjustment element selected from the group consisting of a miniature permanent magnet having adjustable position with respect to the magnetic sensor, a miniature permanent magnet with a soft magnetic shim, said shim having adjustable position with respect to the magnet, and an electromagnet disposed near the magnetic sensor. The adjustment element is employed to control and in some cases cancel a background magnetic field at a magnetic sensor position, said background magnetic field produced by the magnetic core primarily in response to earth magnetic field. Instead of the adjustable element the magnetic sensing assembly may employ a compensation coil coupled with the magnetic core and a stabilized current source.

Another aspect of the present invention is that the sensing coil comprises a plurality of sections, each section comprising at least one disc-wound segment, said segment connected to a low noise bipolar operational amplifier in order to minimize an effect of a current noise source of the operation amplifier and increase self-resonance frequency of the sensing coil.

Yet another aspect of the present invention is that the sensing coil connected to a plurality of low noise FET (regular or chopper-stabilized) operational amplifiers, said amplifiers having inputs connected in parallel in order to minimize an effect of a voltage noise source of the operation amplifiers.

Other aspects and advantages of the invention will be apparent from the following description and the appended claims.

DETAILED DESCRIPTION OF THE INVENTION

In most general terms, the invention provides a high sensitivity magnetic sensor facilitating measurement in a wide frequency range of time-varying magnetic fields generated by electric current in electromagnetically energized geological formations.

Figure 1:
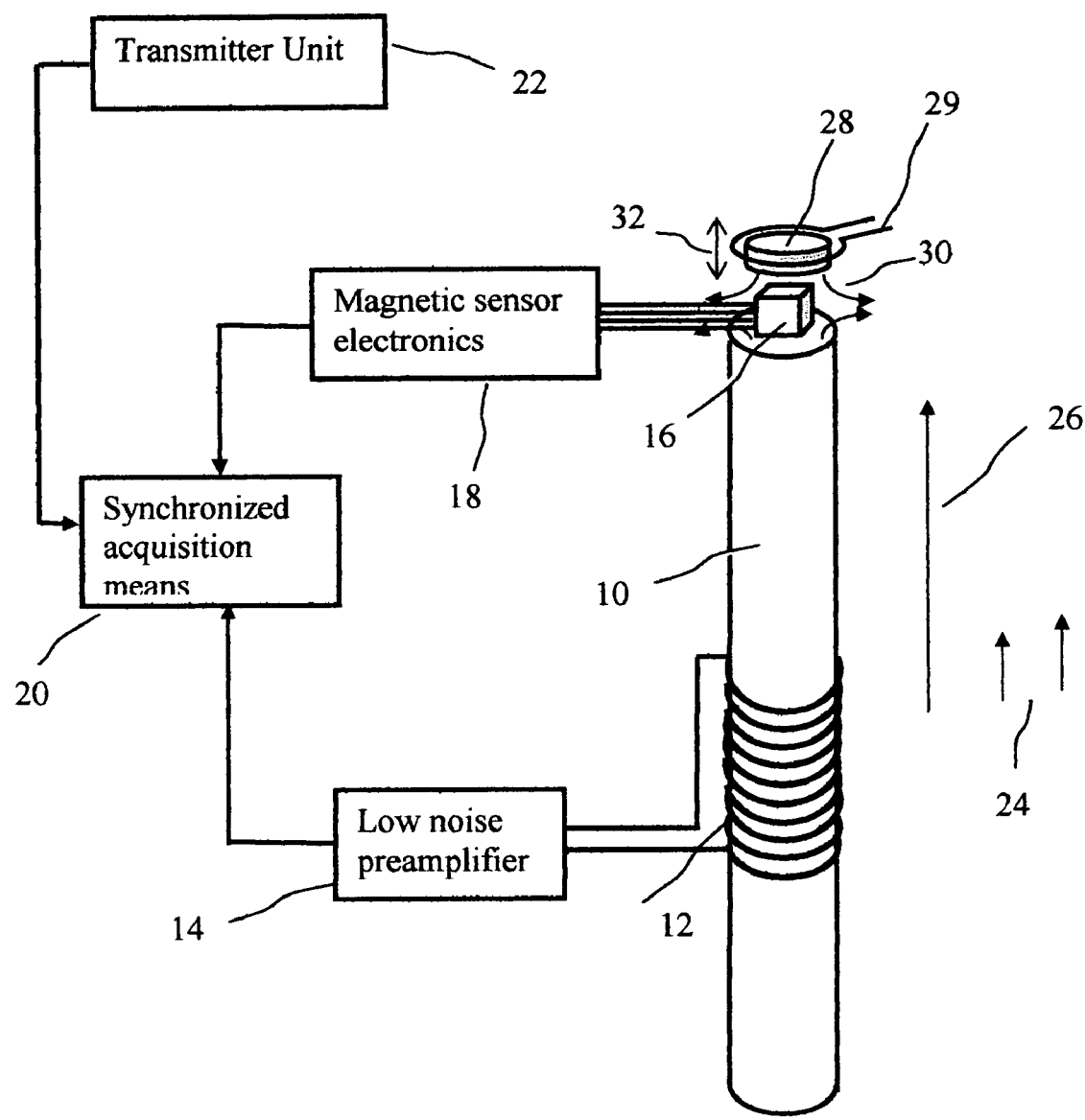
FIG. 1 shows a simplified layout and functional block diagram of the sensor assembly of an embodiment of the present invention.

FIG. 1 represents a simplified layout of a preferred embodiment of the magnetic sensor assembly according to the present invention. The assembly comprises a high permeability magnetic core 10, a coil 12 wound on the core and a miniature low magnetic noise magnetic sensor 16 placed near an edge of the magnetic core 10. The magnetic core has a large length-to-diameter ratio and a direction of elongation preferably set to be collinear with a component of the time-varying magnetic field 24 to be measured. A recently developed chip-scale atomic magnetometer (CSAM) described in P.D.D. Schwindt, et. al., "Chip-scale atomic magnetometer," *Appl. Phys. Lett.* 85, 6409, 2004 or its modifications can be used as the low noise magnetic sensor of the embodiment of the present invention. CSAM is a total-field sensor with the sensor output directly proportional to the magnitude of the magnetic flux density at the sensor position. An alternative low noise magnetic sensor is a millimeter-scale fluxgate magnetometer.

Factors that determine the achievable performance of the magnetic sensing assembly will be explained below to highlight the advantages of the present invention. As will be readily understood by those skilled in the art that the noise voltage spectral density $V_N$ across the coil terminals is related to magnetic noise spectral density $B_N$ according to the following equation $$B_N = \frac{V_N}{2\pi \cdot f \cdot \mu_{eff} \cdot A \cdot N}, \quad (1)$$

where f is the frequency of the time-varying magnetic field, $\mu_{eff}$ is the effective relative permeability of the magnetic core 10, A is the cross-sectional area of the core and N is the number of turns of the sensing coil 12.

The apparent magnetic noise of the magnetic sensor can be expressed as $$B_N = \frac{B_N^S}{E}. \quad (2)$$

Here $B_N^S$ is the intrinsic magnetic noise of the magnetic sensor 16, and E is the magnetic field enhancement factor due to presence of magnetic core. It will be readily understood by those skilled in the art that the magnetic field flux density in vicinity of the end of the core where the magnetic sensor is disposed (see the magnetic sensor 16 position in FIG. 1) should be close to a value of the magnetic flux density in the cross-section of the magnetic core near its end. It is known that the magnetic flux density in a magnetic rod made from a high permeability magnetic material is quite uniform along the length of the rod with 30-40% reduction near the ends. Examples of the distribution can be found in B.C. Snelling, Soft Ferrites (Properties and Applications), London ILIFE BOOKS LTD or R.M. Bozorth, Ferromagnetism, IEEE PRESS, IEEE Inc, New York.

It should be understood that the relationship between magnetic flux density in the central section of the core $B_{core}$ and the magnetic flux density of the external magnetic field far from the magnetic core $B_e$ is as follows:

$$B_{core} = \mu_{eff} B_e. \quad (3)$$

Thus, the magnetic field enhancement factor E can be expressed as $$E = k_E \cdot \mu_{eff} \quad (4)$$

Here coefficient $k_E<1$. In most practical cases $k_E=0.3$-$0.7$ depending on the distance from the sensor to the end of the core relative to the effective transversal dimension (diameter) of the core.

Combining equation (1) and (2) gives the expression for the crossing frequency $f_c$ that separates spectral region $f<f_c$ where the magnetic sensor data should be preferably used from the region $f>f_c$ where the induction coil is more efficient:

$$f_c = \frac{k_E \cdot V_N}{2\pi \cdot B_N^S \cdot A \cdot N} \quad (5)$$

If, for example, $V_N=10$ nV/$\sqrt{Hz}$, $k_E=0.31$, $B_N^S=100$ pT/$\sqrt{Hz}$ (typical for an existing CSAM), $A=0.25 \cdot 10^{-4}$ m$^2$, N=20,000 then the crossing frequency is $f_c=10$ Hz. An assumption is made in equation (5) that $V_N$ does not substantially depend on frequency. The assumption is valid when the noise voltage is determined by the thermal noise of the coil wire or by the operation amplifier with low frequency noise stabilization (for example, chopper-stabilized amplifier AD 8551).

It follows from the equations (1), (2) and (4) that the noise level and correspondingly the minimum detectable level of the magnetic field are inversely proportional to the effective magnetic permeability $\mu_{eff}$ of the magnetic core. The effective permeability is primarily determined by the elongation ratio of the magnetic core. An explanation for this fact can be found, for example in E. C. Snelling, Soft Ferrites (Properties and Applications), London ILIFE BOOKS LTD or in R. M. Bozorth, Ferromagnetism, IEEE PRESS, IEEE Inc, New York, where the effective permeability of magnetic rods was calculated for different length-to-diameter ratio of the magnetic core and various intrinsic permeability of a high permeability magnetic material used for making the core. For example, the elongation ratio of 100 gives effective permeability of about 2,000 the permeability is practically independent of the permeability of a magnetic material in case the latter exceeds 10,000. For the elongation of 200 the numbers for the effective permeability and the desired minimum magnetic material permeability are 5,000 and 20,000 respectively. The fact that the effective permeability of the magnetic core is mainly determined by geometrical factors means that it stable with respect to magnetic material permeability changes due to temperature variation or external applied stress. In order to reach best stability the material permeability should be preferably highest possible. A variety of commercially available soft magnetic materials can be used that have permeability in excess of 100,000. A practical approach to choosing the length-to-diameter ratio of the magnetic core is to satisfy a predetermined $B_N$ while keeping the total weight and length as small as possible. It can be derive from the data and the equations described in R. M. Bozorth, Ferromagnetism, IEEE PRESS, IEEE Inc, New York that the following approximate relationship between effective permeability and the core dimensions take place:

$$\mu_{eff} \propto \frac{l^2}{A}, \quad (6)$$

where l is the length of the magnetic core and A its cross-sectional area.

Combining relationship (6) with the equation (1) one can readily come to conclusion that the induction coil noise is independent of the cross-sectional area of the magnetic core and primarily determined by the length of the core. Thus, a required minimum magnetic field detection level of the induction coil predetermines the length of the core. Practical limit for minimal diameter (cross-sectional area) of the magnetic core is that the effective permeability of the magnetic core should be still (see above for the stability consideration) much less than the magnetic material permeability. Yet another limit is placed by that the cross-sectional area of the core near its end should be comparable with or exceed the area of the miniature magnetic sensor.

The advantage of using low noise magnetic sensor in the sensing assembly of the present invention compared to using just induction coil of prior art can be readily understood from equation (1). Let a low frequency noise for an induction coil of prior art (see for example BF-4 coil of Schlumberger) be specified at 1 Hz. Let also the magnetic sensor of the sensing assembly of the present invention meet the low noise requirement at $f<f_c$ up to 10 Hz crossing frequency. Then, as it follows from the equation (1), the requirement to the magnetic noise of the induction coil of the present invention can be met with 10 times less $\mu_{eff}$ as compared to the induction coil of prior art. This means about 3 times reduced length of the magnetic core (see equation (6)).

The magnetic sensing assembly in FIG. 1 further comprises a miniature permanent magnet or electromagnet 28, and preferably adjustment coil 29 placed near the miniature magnetic sensor in a way that its magnetic field substantially compensates the earth magnetic field 26 at the magnetic sensor position. The magnetic field lines near the sensor are shown at 30 in FIG. 1. If a direction of the elongation axis of the magnetic core with respect to direction the earth magnetic field is known, then the magnetic field produced by the core magnetized in the earth field can be cancelled by adjusting position of the magnet in the direction shown at 32 in FIG. 1. The magnet is preferably made from temperature stabilized hard magnetic material. The adjustment coil 29 is preferably connected to a high stability current source to facilitate fine adjustment of the magnetic field at the magnetic sensor position.

If a CSAM sensor is used as a magnetic sensor some bias (non-zero) magnetic field may be needed for its operation. The miniature magnet and adjustment coil may be used to control the magnetic field at the position of the magnetic sensor and thus setting an optimal bias magnetic field. Since the bias magnetic field should be substantially homogeneous over the volume of the CSAM magnetic sensor additional soft magnetic shims and coils may be used to achieve required homogeneity.

The magnetic sensing assembly in FIG. 1 further comprises a low noise preamplifier 14 with its output, along with the output of the magnetic sensor electronics 18, connected to the acquisition means 20. The latter is synchronized with the electromagnetic transmitter unit 22 used to energize the geological formation. The synchronization facilitates stacking the measurement data, the staking needed to average out random signal including incoherent signals related to fluctuation of the earth magnetic field and the sensing assembly motional effects. The data stacking capability is of particular importance in case broadband excitation employed in transient electromagnetic measurements.

Figure 2:
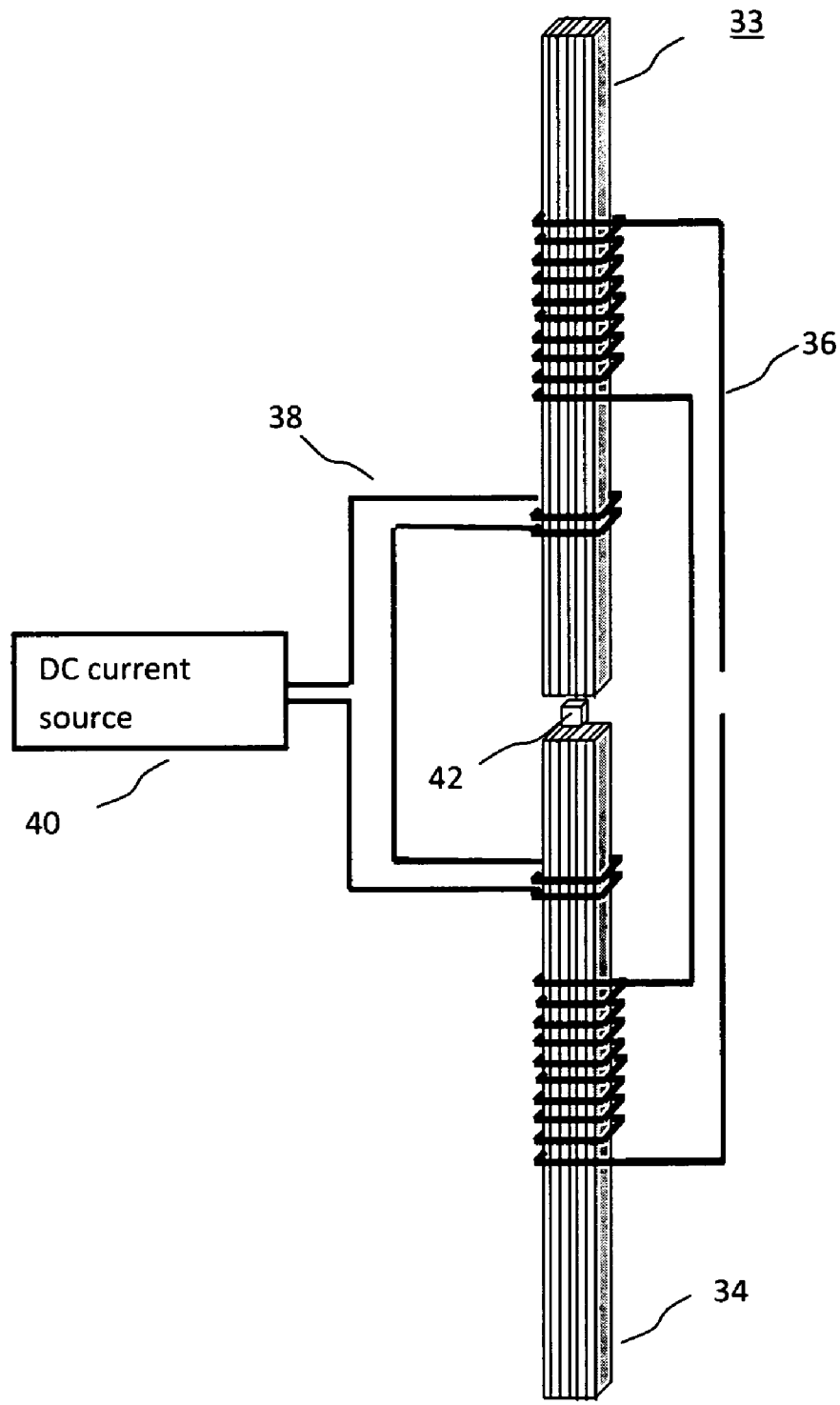
FIG. 2 represents embodiment of the magnetic sensing assembly with the magnetic sensor disposed in the gap between two sections of the magnetic core.

FIG. 2 presents an embodiment of the present invention, in which the magnetic core is made in two sections 33 and 34 separated by an air gap where the magnetic sensor 42 is placed. The magnetic sensing assembly in FIG. 2 further comprises the sensing coil 36, a compensation coil 38 substantially coupled with the magnetic core, and a stabilized current source 40. The compensation coil 38 and the stabilized current source 40 are employed to control a background magnetic field at a magnetic sensor position. The background magnetic field is produced by the magnetic core primarily in response to earth magnetic field.

The magnetic core sections are preferably made of stacks of long thin magnetic metal strips or ribbons separated with non-conductive layers. The magnetic metal can be, a high permeability permalloy or a high permeability magnetic amorphous material. It should be understood that a time-varying magnetic field generates eddy currents in the conductive magnetic strips. This will cause delay in building up the average magnetization of the magnetic core and affect the high frequency limit of operation of the magnetic sensing assembly. To ensure that the delay does not distort the amplitude and phase of the time-varying magnetic field the magnetic strips must be thin enough. In frequency spectrum terms this means that the thickness should be substantially smaller than the electromagnetic skin depth for the maximum frequency of the spectral band of the magnetic field. If, for example, the required maximum operating frequency is 20 kHz, then the thickness of the magnetic strip should not preferably exceed 0.02 mm.

Figure 3:
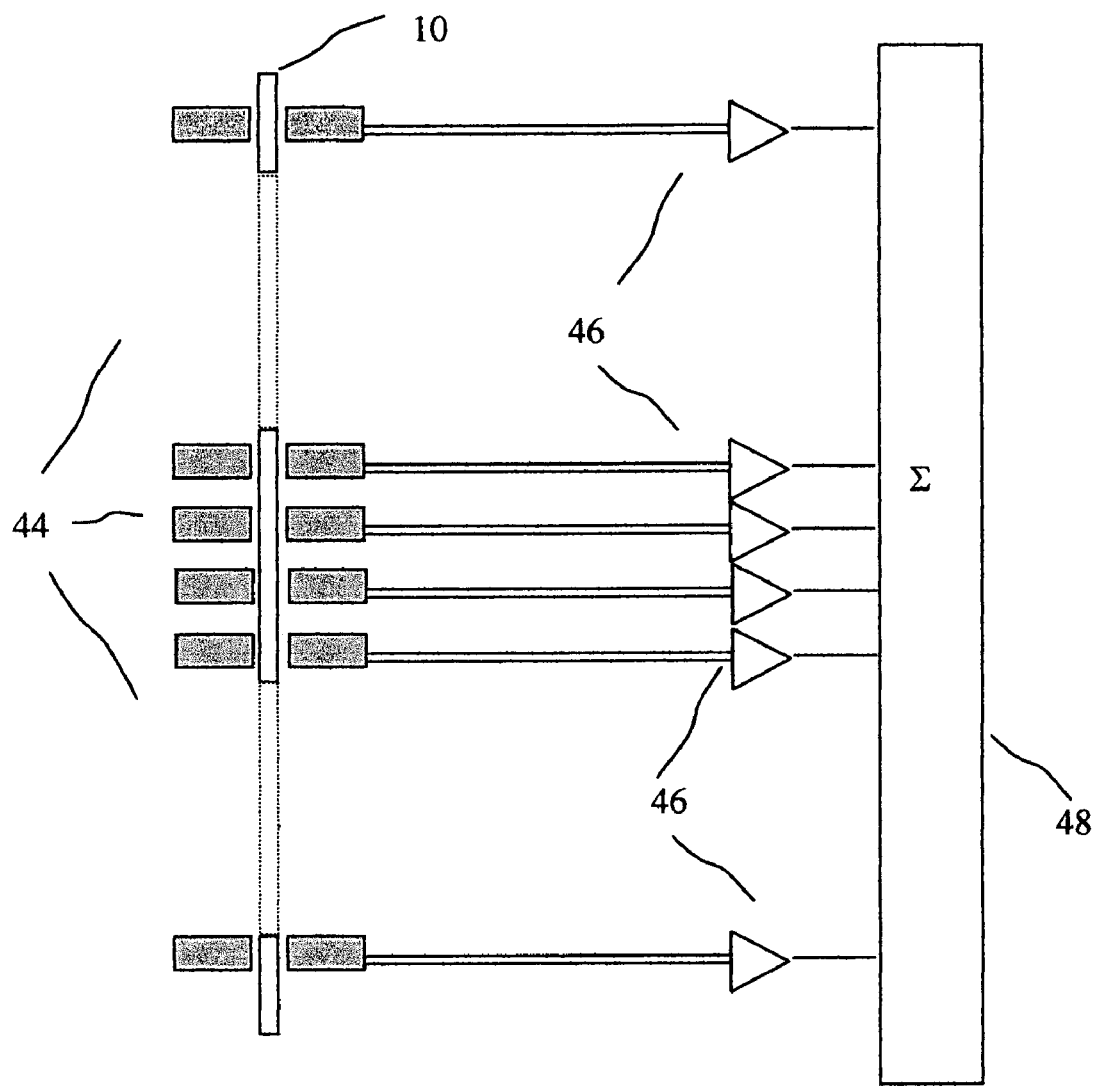
FIG. 3 shows an arrangement of the sensing coil made of a plurality of sections, the arrangement employing a plurality of low voltage noise operational amplifiers.

FIG. 3 represents an embodiment of the present invention where the sensing induction coil comprises a plurality of sections 44, disposed on the magnetic core 10, each section connected to its own low noise operational amplifier 46. The effect of making the sensing coil in many sections, each of which connected to an amplifier is explained below.

An ultra-low noise bipolar transistor based operational amplifier is preferably used for the embodiment of the present invention. An example of such operation amplifier is Linear Technology LT1128 that has input equivalent voltage noise less than $V_{NV}$=4 nV/$\sqrt{Hz}$ at 1 Hz. This voltage noise is at least 10 times lower than the equivalent low frequency voltage noise of an operational amplifier based on junction field effect transistors (including chopper stabilized version of low noise amplifiers). It is well known by those skilled in the art that a disadvantage of the bipolar amplifier that in some cases prevents it from being used is relatively high current noise, which is for LT1128 reaches up to $I_N$=10 pA/$\sqrt{Hz}$ at 10 Hz. This means that if the coil impedance exceeds $V_{NV}/I_N$=400 Ohm the current noise of the preamplifier dominates the noise related to the voltage source of noise. This fact suggests that a signal source for the amplifier should have relatively low impedance. Correspondingly a multi-section design with each section connected to its own amplifier should be favored.

In case of a multi-sectional sensing coils the following relationships take place for the input noise power density of the amplifier for one section-to-amplifier circuit:

$$V_{NS}^2 = I_N^2 \cdot |Z_S|^2 + V_{NV}^2 + V_{NS}^2, \quad (7)$$

where $|Z_S|$ is the impedance of the coil section, and $V_{NS}^2$ is the power density of the thermal noise of the coil wire. The impedance of the section comprises inductive and resistive parts. The following simplified assumption can be made to illustrate the advantage of the multi-sectional arrangement versus a single section coil (or just serially connected sections). First, the inductive part of the section impedance for low frequency (~1 Hz) is dominated by the resistive one. Second, the thermal noise of one section of the coil is much less then the amplifier voltage noise. Making these assumptions will not change the conclusion about the benefits of using the arrangement of FIG. 3. Denoting the total number of sections in the coil and the total number of turns in the coil as M and N respectively and taking into account the assumption made the equation (7) can be written as follows $$V_{NS}^2 = I_N^2 \cdot \frac{|Z|^2}{M^2} + V_{NV}^2, \quad (8)$$

where $|Z|$ is the impedance of a single-section coil having the total number of turns N. Then for the signal-to noise ratio SNR on the output of the summer shown at 48 in FIG. 3 one gets $$SNR = \frac{S_S \cdot M^2}{\sqrt{I_N^2 \cdot |Z|^2 + V_{NV}^2 \cdot M^2}}. \quad (9)$$

Until noise related to the current source dominates the other source the last equation gives $$SNR = \frac{S_S \cdot M^2}{I_N \cdot |Z|} = \frac{S_0 \cdot M}{I_N \cdot |Z|} = M \cdot SNR_0,$$

where $S_0$ and $SNR_0$ are the signal of the single-section coil with total number of turns N and corresponding signal-to-noise ratio for the single-section coil. Thus the multi-sectional arrangement gives signal-to-noise enhancement by a factor of M—the number of sections. It should be understood that even higher enhancement factor will be achieved if an inductive part of the coil impedance is taken into account. This is a consequence of the fact that the inductive part of the impedance for strong inductively coupled sections is proportional to the number of sections squared.

An advantage of the sensing coil arrangement of FIG. 3 as compared to just serially connected sections is that the arrangement reduces the self-resonance frequency of the coil. The resonance frequency places the upper limit on the operating frequency range of the coil. The self-resonance is caused by the stray capacitance between turns and layers of the coil windings. For the sections axially separated approximately by the distance equal to the section size in axial direction as shown in FIG. 3 the sections can be considered as not having capacitive coupling. At the same time they are strongly coupled inductively due to presence of magnetic core. Thus the following relationship exist between the total inductance L and capacitance C of serially connected sections coil and the inductance $L_S$ and capacitance $C_S$ of one section of the sensing coil of FIG. 3:

$$L = M^2 \cdot L_S, \quad C = C_S/M \quad (10)$$

Then for the self-resonance frequency:

$$f_S = \frac{1}{2\pi\sqrt{L_S \cdot C_S}} = \sqrt{M} \cdot f_0$$

where $f_S$ and $f_0$ are respectively the resonance frequency of the multi-sectional coil of FIG. 3 and the serially connected sections.

In order to reduce $C_S$ the disk-shaped sections should be preferably used for the coil winding.

Figure 4:
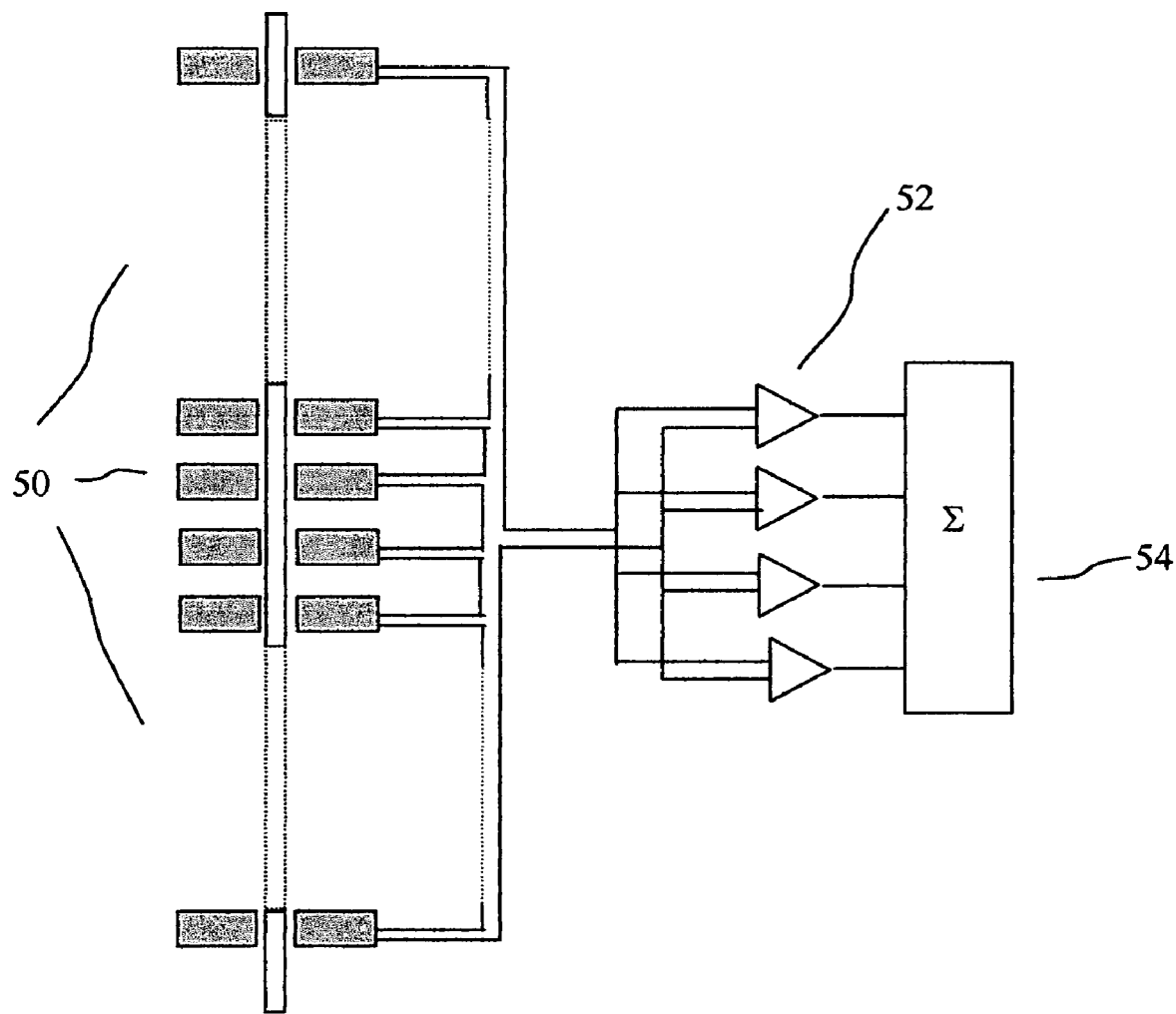
FIG. 4 illustrates a sensing coil with the first stage of the signal amplification for which a plurality of low current noise FET operational amplifiers is used.

FIG. 4 illustrates yet another embodiment of the sensing coil of the present invention. All sections shown at 50 are connected in series and coil is connected to a plurality of low noise FET operational amplifiers. The current noise is typically negligible for this type of operational amplifiers. To minimize an effect of the voltage noise source of the operation amplifiers the inputs of the amplifiers are connected in parallel. It should be understood that the measured signals on the outputs of the amplifiers adds up linearly with the number of amplifiers in the summer 52 while the noise increases as square root of the number of amplifiers. Practical limit for number of the amplifiers used according to the arrangement in FIG. 4 is placed by the input capacitance of the amplifiers. The capacitance adds up when the inputs of the amplifiers are connected in parallel and at some point may dominate the stray capacitance of the coil itself. This can lower the self-resonance frequency. A preferred operational amplifier for the arrangement of FIG. 4 is AD8628 (Analog Device).

While the invention has been described with respect to a limited number of embodiments, those skilled in the art, having benefit of this disclosure, will appreciate that other embodiments can be devised which do not depart from the

What I claim as my invention is:

1. An instrument for determining an electromagnetic property of geological formations, comprising a transmitter to generate a time-varying electric current in the formations and a magnetic sensing assembly including:
   a magnetic core having a high magnetic permeability;
   a sensing coil wound on the magnetic core to produce an induction voltage signal proportional to a time rate of change of a magnetic field generated by the time-varying electric current in the geological formations,
   at least one magnetic sensor disposed near an edge of the magnetic core and magnetically coupled with the magnetic core to produce a magnetic sensor output signal proportional to magnetic flux density in the magnetic core; and
   acquisition means for receiving and processing the induction voltage signal and the magnetic sensor output signal in order to provide low noise output over a wide frequency range.

2. The apparatus of claim 1 wherein acquisition means include means for measuring said induction voltage signal and said magnetic sensor output signal in a selected digitizing time window said time window is synchronized to a cycle of the time-varying electric current in the formations, corresponding samples obtained in each cycle of the time-varying electric current are cumulatively summed over a number of such cycles in order to average out signals incoherent with the magnetic field generated by the time-varying electric current in the geological formations.

3. The apparatus of claim 1 wherein the magnetic sensing assembly further comprises an adjustment element selected from the group consisting of a miniature permanent magnet having adjustable position with respect to the magnetic sensor, a miniature permanent magnet with a soft magnetic shim, said shim having adjustable position with respect to the magnet, and an electromagnet disposed near the magnetic sensor, said adjustment element is employed to control a background magnetic field at a magnetic sensor position, said background magnetic field produced by the magnetic core primarily in response to earth magnetic field.

4. The apparatus of claim 1 wherein the magnetic sensing assembly further includes a compensation coil substantially coupled with the magnetic core and a stabilized current source, said compensation coil and the current source are employed to control a background magnetic field at a magnetic sensor position, said background magnetic field produced by the magnetic core primarily in response to earth magnetic field.

5. The apparatus of claim 1 wherein the at least one magnetic sensor is selected from the group consisting of chip-scale atom-optical magnetometer and miniature fluxgate sensor.

6. The apparatus of claim 1 wherein the sensing coil comprises a plurality of sections, each section comprising at least one disc-wound segment, said segment connected to a low noise bipolar transistor operational amplifier in order to minimize an effect of a current noise source of the operational amplifier and increase self-resonance frequency of the sensing coil.

7. The apparatus of claim 1 wherein the sensing coil connected to a plurality of low noise FET operational amplifiers, said amplifiers having inputs connected in parallel in order to minimize an effect of a voltage noise source of the operation amplifiers.

8. The apparatus of claim 1 wherein dimensions of the magnetic core are chosen in relation with a magnetic sensing assembly noise requirement.

9. The apparatus of claim 1 wherein the magnetic core comprises two elongated sections separated by an air gap, and the magnetic sensor is disposed in said gap.

10. The apparatus of claim 1 wherein magnetic core is made of a soft magnetic material selected from the group consisting of ferrite, electrically conductive crystalline magnetic metal strips and magnetic amorphous ribbons or strips.

11. The apparatus of claim 10 wherein the magnetic field generated by the time varying electric current in the geological formations has a maximum rate of change, and said ribbons or strips have thickness selected in relation with the maximum rate of change.

* * * * *